United States Patent [19]
Takeuchi et al.

[11] Patent Number: 5,513,012
[45] Date of Patent: Apr. 30, 1996

[54] IMAGE FORMING APPARATUS HAVING DENSITY CORRECTION FOR IMAGE FORMATION

[75] Inventors: Makoto Takeuchi, Yokohama; Akio Noguchi, Ebina; Yukihide Ushio, Tokyo; Shimpei Matsuo, Tokyo; Seiji Uchiyama, Tokyo; Kazuro Yamada, Machida; Yoji Serizawa, Tokyo, all of Japan

[73] Assignee: Canon Kabushiki Kaisha, Tokyo, Japan

[21] Appl. No.: 734,905

[22] Filed: Jul. 24, 1991

[30] Foreign Application Priority Data

Jul. 26, 1990 [JP] Japan ................................ 2-196127
Jul. 26, 1990 [JP] Japan ................................ 2-196128

[51] Int. Cl.$^6$ ........................... H04N 1/21; H04N 1/32
[52] U.S. Cl. .................. 358/401; 358/438; 358/462; 358/300; 395/109; 395/110; 347/131
[58] Field of Search .................... 358/401, 300, 358/296, 298, 455, 456, 458, 462, 467, 436, 438, 470; 355/214, 246, 208; 346/153.1, 154, 157, 160

[56] References Cited

U.S. PATENT DOCUMENTS

| | | | |
|---|---|---|---|
| 4,547,812 | 10/1985 | Waller | 358/298 |
| 4,563,086 | 1/1986 | Knapp | 355/246 |
| 4,607,944 | 8/1986 | Rushing | 355/246 |
| 4,655,582 | 4/1987 | Okuda . | |
| 4,888,618 | 12/1989 | Ishikawa | 355/246 |
| 4,910,557 | 3/1990 | Imai | 355/246 |
| 4,962,394 | 10/1990 | Sohmiya et al. | 355/200 |
| 4,967,211 | 10/1990 | Colby | 355/246 |
| 5,001,576 | 3/1991 | Tanaka | 358/462 |
| 5,038,175 | 8/1991 | Sohmiya et al. | 355/246 |
| 5,041,915 | 8/1991 | Hirota | 358/438 |
| 5,075,726 | 12/1991 | Itaya et al. | 355/246 |
| 5,093,903 | 3/1992 | Sudoh et al. | 395/110 |
| 5,103,303 | 4/1992 | Shoji et al. | 358/470 |
| 5,235,675 | 8/1993 | Sudoh | 395/109 |

FOREIGN PATENT DOCUMENTS

| | | |
|---|---|---|
| 49351 | 3/1985 | Japan . |
| 247659 | 12/1985 | Japan . |
| 282961 | 11/1989 | Japan . |
| 289371 | 11/1989 | Japan . |

Primary Examiner—Scott A. Rogers
Attorney, Agent, or Firm—Fitzpatrick, Cella, Harper & Scinto

[57] ABSTRACT

An image forming apparatus for adjusting image density includes an input device for inputting a plurality of image type information and a discriminating device for discriminating the image type information in accordance with a signal other than a signal to be recorded. An image forming circuit, such as a printer, forms an image on the basis of image type information. A density adjusting circuit adjusts the image forming density of the image forming circuit in accordance with the input image type information. The discriminating device inputs a signal indicative of whether the input image type information indicates a text image or a graphics image, or whether it denotes Japanese or a European language (e.g., English). The discriminating device also inputs a signal indicative of the kind of font included in the input image type information or a signal indicative of a resolution for an output image to be formed by the printer.

8 Claims, 10 Drawing Sheets

| INPUT | 00H | 40H | 80H | C0H | FFH |
| OUTPUT | 00H | 40H | 80H | C0H | FFH |

| 00H | 40H | 80H | C0H | FFH |
| 00H | 60H | C0H | E0H | FFH |

| 00H | 40H | 80H | C0H | FFH |
| 00H | 20H | 40H | A0H | 80H |

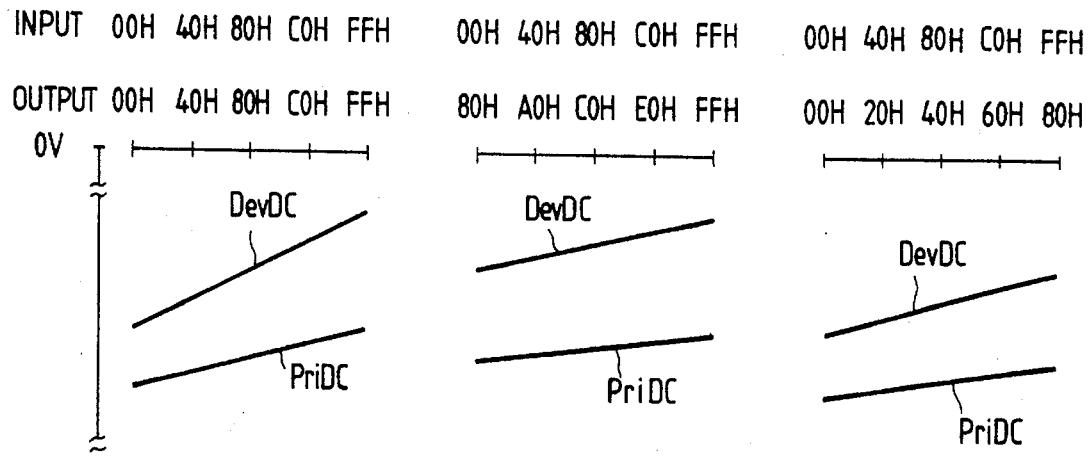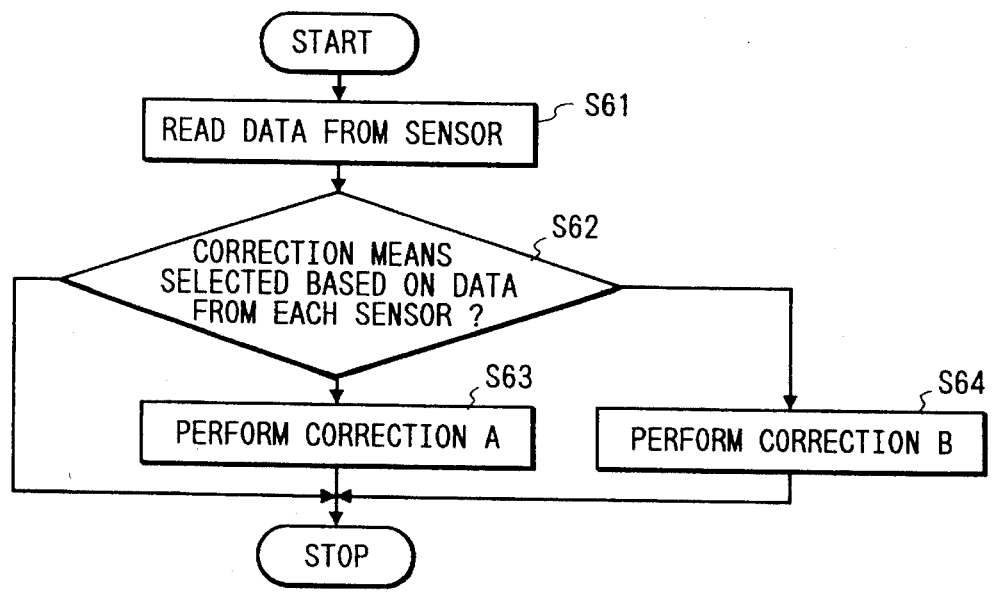

IMAGE FORMING APPARATUS HAVING DENSITY CORRECTION FOR IMAGE FORMATION

BACKGROUND OF THE INVENTION

1. Field of the Invention

The invention relates to an image forming apparatus which can adjust a density.

2. Related Background Art

FIG. 4 is a circuit block diagram showing an example of a development density adjusting circuit according to a conventional image forming apparatus. Reference numeral 100 denotes a high-voltage power source control unit to control a high-voltage power source output to a photo sensitive material and 101 indicates a volume resistor. By making a resistance value of the volume resistor 101 variable, a high-voltage DC output PriDC to determine a charging potential to the surface of the photo sensitive material and a high-voltage DC output DevDC to decide a development bias potential are interlocked and each of the above potentials can be linearly adjusted.

Although the high-voltage power source output includes a copy transfer high-voltage output or a high-voltage AC output which is multiplexed to the high-voltage DC output PriDC in dependence on a system processing format or the like in addition to the above outputs, they are omitted here.

In the high-voltage power source control unit 100, OSC denotes a pulse output which is supplied to transistors 109 and 129 to drive transformers 118 and 130 to generate the high-voltage DC output PriDC and the high-voltage DC output DevDC. $HV_1$ denotes an ON/OFF signal of the high-voltage DC output PriDC and $HV_2$ indicates an ON/OFF signal of the high-voltage DC output DevDC.

The high-voltage DC outputs PriDC and DevDC are determined by emitter potentials of transistors 116 and 145, namely, by outputs of operational amplifiers 113 and 140, respectively. Further, the outputs of the operational amplifiers 113 and 140 are decided by constructions of the volume resistor 101, resistors 102 104, and 105, and a power source voltage VCC. That is, the outputs of the operational amplifiers 113 and 140 are decided by an open loop gain due to voltages to inverting inputs of the operaitonal amplifiers 113 and 140 and differential voltages to non-inverting inputs thereof. Since the voltages to the inverting inputs and the non-inverting inputs of the operational amplifiers 113 and 140 are almost equal, the high-voltage DC output PriDC is determined by a voltage drop component through a resistor 126 by a current ipri which is caused due to a difference between the input voltage to the inverting inputs and the voltage which is obtained by dividing the power source voltage VCC by resistors 122 and 123. The same shall also apply to the high-voltage DC output DevDC.

Reference numerals 112, 115, 120, 133, 137, and 141 denote capacitors; 114, 117, 119, 131, 132, and 146 diodes; 103, 106, 107, 108, 110, 111, 121, 124, 127, 128, 134, 136, 138, 139, 142, and 144 resistors; and 125 and 143 transistors.

The development density adjusting operation by the volume resistor 101 will now be described hereinbelow with reference to FIG. 5.

FIG. 5 is a diagram showing the relation between the development density adjustment by the volume resistor 101 shown in FIG. 4 and the adjustment potential. An axis of ordinate denotes a potential and an axis of abscissa indicates an adjustment level F. $F_1$ corresponds to a GND potential, $F_5$ corresponds to VCC/2, and $F_9$ corresponds to VCC.

As will be understood from the diagram, each time the user operates a density setting switch in an operation unit, the adjustment level F changes and the high-voltage DC output PriDC and the high-voltage DC output DevDC which decides the development potential are linearly made variable in accordance with such a level change, so that a print image can be adjusted from a dense state to a light state. FIG. 5 shows the characteristics in the case where the electrophotographic process is performed by an image exposure, namely, the case of an inversion development in which an exposing portion is developed.

In the above conventional apparatus, however, the toner density adjustment is unconditionally determined by only the volume resistor 101, so that there are the following problems.

That is, an information which is processed by the image forming apparatus, not only a text image but also a graphics image can be processed. In the text image, as a language which is processed, not only Japanese but also English or European characters and the like can be processed. Further, a resolution can be also arbitrarily set (for instance, 200, 300, 400, 600 dpi (dots per inch)). In the case of such a flexible construction, one density adjustment level can be varied only by a default value, the density adjustment which is optimum to the output information cannot be performed, and the print quality extremely fluctuates.

If the user sets the corresponding density level, considerable temporary outputting processsses are needed until an output of the optimum density is derived. There are problems such that the running costs multiplicatively increase and the like.

Hitherto, the density level can be adjusted only every level by the volume resistor 101 in spite of the fact that the toner density changes also for a change in processing condition due to an environmental fluctuation. Thus, there are problems such that it is necessary to execute the density setting scanning operations many times until the optimum toner density is obtained, unnecessary test printing processes and the like are required, an economical burden increases, and the like.

SUMMARY OF THE INVENTION

It is an object of the invention to provide an image forming apparatus which can solve the drawbacks of the conventional techniques as mentioned above.

According to one aspect, it is another object of the invention to obtain an image forming apparatus which can obtain an image density which is optimum to input image information in accordance with the kind of the input image information.

According to another aspect of the invention, there is provided an image forming apparatus comprising: input means for inputting an image information kind; and density adjusting means for adjusting a density on the basis of the kind supplied from the input means.

With the above construction, when the image information is supplied, the setting means automatically adjusts the density in accordance with the kind of the image information, thereby enabling the image information to be recorded at the image density which is optimum to the image information kind.

According to still another aspect, it is an object of the invention to obtain an image forming apparatus which can form an image at an optimum density while detecting a state of image forming means.

According to one aspect of the invention, there is provided an image forming apparatus comprising: detecting means for detecting a state of image forming means; and density adjusting means for adjusting a density on the basis of the results of the detection of the detecting means.

In the above construction, when a state of the image forming means is detected by the detecting means, the density adjusting means adjusts the density on the basis of the result of the detection of the detecting means, thereby enabling image information to be recorded at an optimum image density in accordance with the state.

BRIEF DESCRIPTION OF THE DRAWINGS

FIGS. 6A to 6C are characteristic diagrams for explaining setting processes of the high-voltage DC outputs PriDC and DevDC by a toner density correction unit shown in FIG. 6;

FIG. 6D is a flowchart for explaining an example of a density setting processing procedure in the image forming apparatus in FIG. 6;

DETAILED DESCRIPTION OF THE PREFERRED EMBODIMENTS

Figure 10:
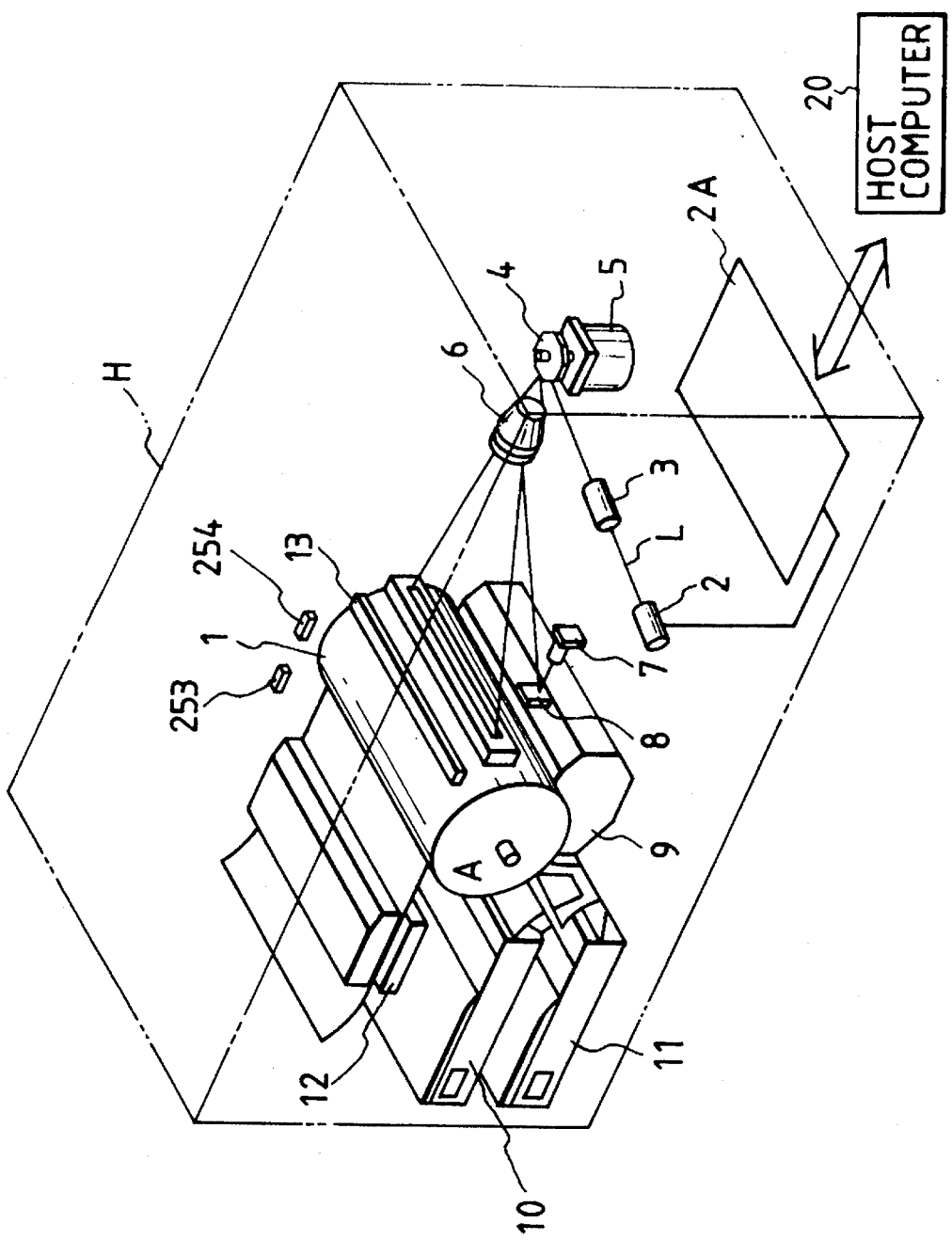
FIG. 10 is a perspective view showing a laser beam printer to which the invention can be applied.

FIG. 10 is a perspective view of a laser beam printer to which the first to third embodiments of the invention can be applied.

In the diagram, reference numeral 1 denotes a photo sensitive drum which is rotatably supported in a housing H and has a semiconductor layer of selenium, cadmium sulfide, or the like on the surface. The drum 1 is rotated at a constant velocity in the direction indicated by an arrow A in the diagram. Reference numeral 2 denotes a semiconductor laser to emit a laser beam L and 2A indicates a control circuit to control a laser light quantity of the semiconductor laser 2 and the on/off operations thereof in accordance with input information.

The laser beam L radiated from the semiconductor laser 2 enters a beam expander 3 and becomes a laser beam having a predetermined beam diameter. The laser beam is transferred to a polygon mirror 4 having a plurality of mirror surfaces. Since the polygon mirror 4 is rotated at a predetermined speed by a low-speed rotating motor (scanner motor) 5, the laser beam emitted from the beam expander 3 is reflected by the polygon mirror 4 which rotates at a constant speed and is scanned substantially in the horizontal direction. The laser beam is subsequently image formed as a spot light by an image forming lens 6 having f-θ characteristics onto the photo sensitive drum 1 which has been charged to a predetermined polarity by a charging device 13.

Reference numeral 7 denotes a beam detector to detect the laser beam reflected by a reflecting mirror 8. A timing for a modulating operation of the semiconductor laser 2 to obtain desired light information on the photo sensitive drum 1 is determined by a detection signal of the beam detector 7. On the other hand, an electrostatic latent image is formed onto the drum 1 by the laser beam which has been image formed and scanned in accordance with the above input information. The latent image is developed by a toner by a developing device 9 and, after that, a developed image is copy transferred onto a recording medium (generally, paper or sheet) fed from either one of cassettes 10 and 11. After that, the recording medium passes through a fixing device 12, so that the image is fixed on the recording medium. The recording medium is subsequently discharged to a discharge unit (discharge tray; not shown). A host computer 20 supplies not only image information and print information such as character codes and the like but also resolution designation information and the like to the control circuit 2A. Reference numerals 253 and 254 denote sensors to detect a temperature and a humidity of a region around the photo sensitive material, respectively.

In the embodiment, a charging voltage of the charging device 13 and a developing bias of the developing device 9 can be varied, so that a density can be changed.

Figure 1:
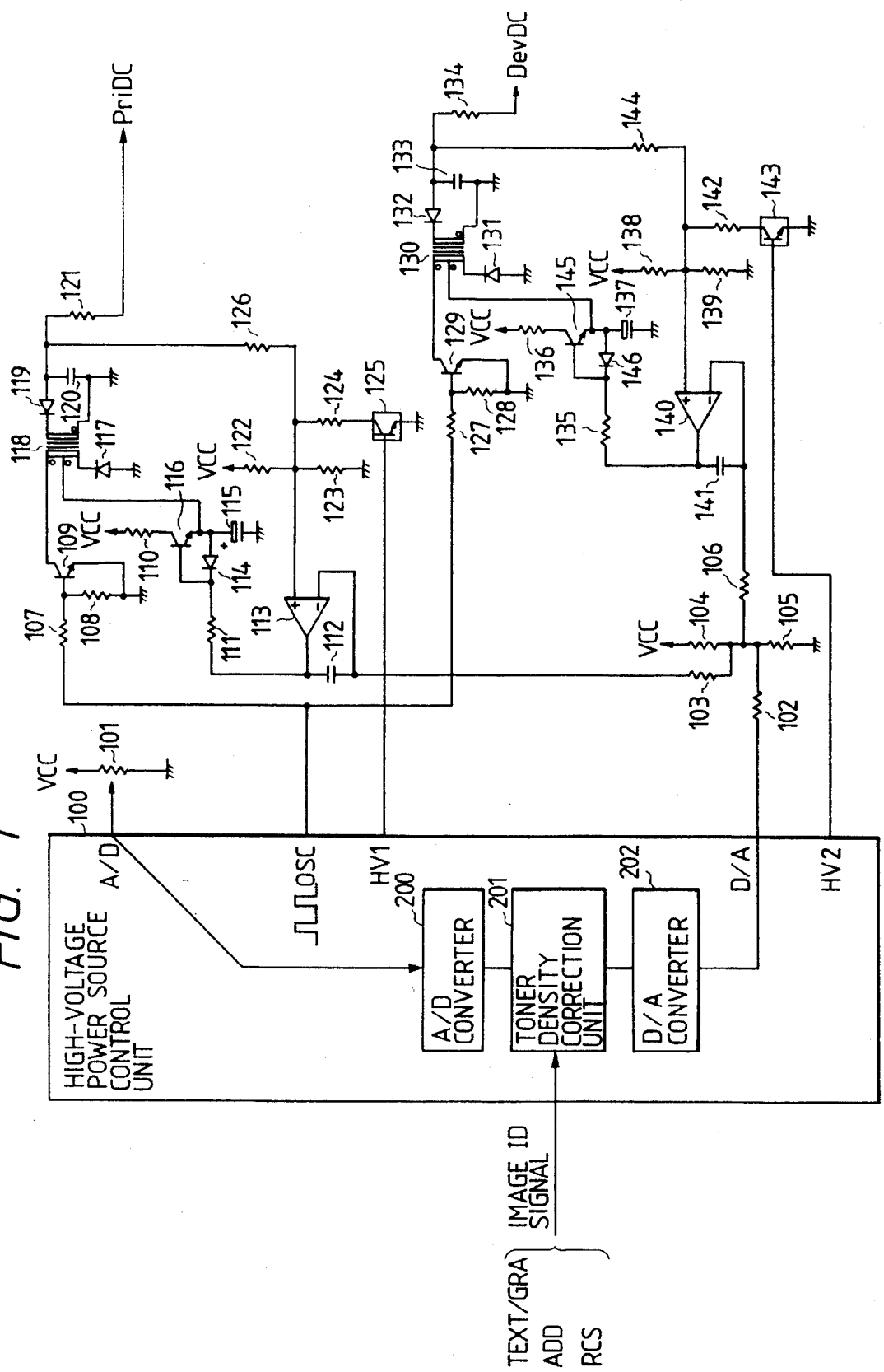
FIG. 1 is a circuit block diagram showing an example of a density setting circuit in an image forming apparatus according to the first embodiment of the invention.
Figure 4:
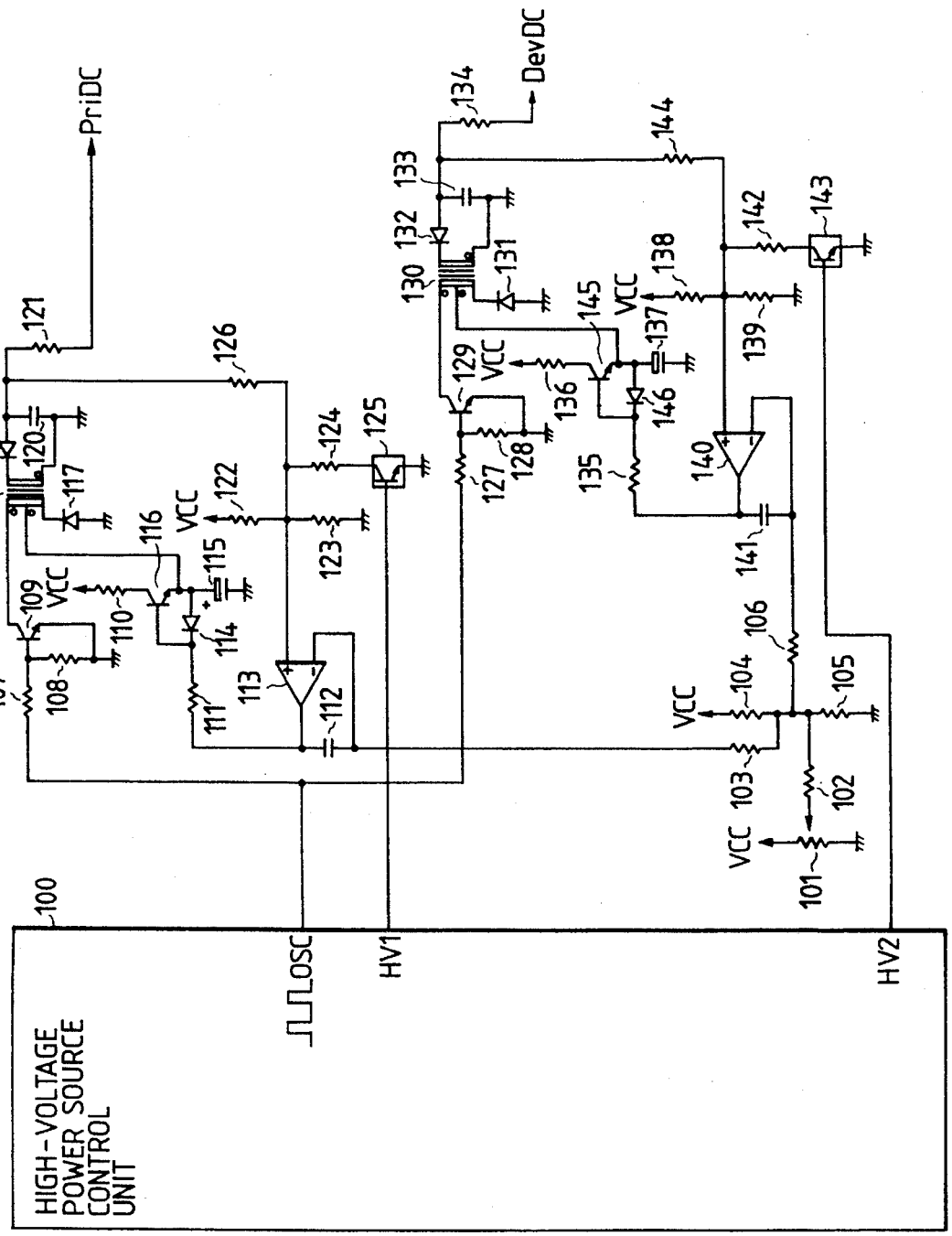
FIG. 4 is a circuit block diagram showing an example of a development density adjusting circuit according to a conventional image forming apparatus.
Figure 5:
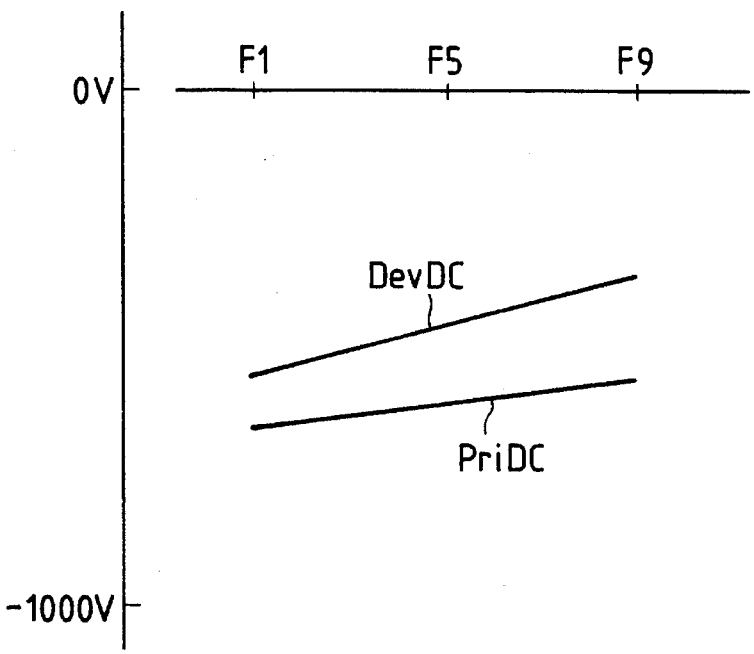
FIG. 5 is a diagram showing the relation between the development density adjustment by a volume resistor shown in FIG. 4 and the adjustment potential.

FIG. 1 is a circuit block diagram showing an example of a density setting circuit in an image forming apparatus according to an embodiment of the invention. In FIG. 1, the same parts and components as those shown in FIG. 4 are designated by the same reference numerals.

In FIG. 1, reference numeral 200 denotes an A/D converter for converting a set potential of the volume resistor 101 into a digital signal (density set data) and supplying to a toner density correction unit 201 (correcting means in the embodiment). An image ID signal which is obtained by analyzing the kind of input image information is supplied to the toner density correction unit 201. On the basis of the image ID signal, either one of correcting means A and B and a mode to execute no correction is selected. The density set data is corrected and converted into a predetermined value. The correction value is supplied to a D/A converter 202. A correction potential is set into the resistor 102 on the basis of a D/A output of the high-voltage power source control unit 100.

The toner density correction unit 201 is constructed by a microcomputer comprising a CPU, an ROM, an RAM, and the like.

In the image forming apparatus constructed as mentioned above, when image information is supplied, the setting means (toner density correction unit 201) discriminates the kind of image information and automatically determines a density set value. The density adjusting means (setting of the high-voltage DC outputs PriDC and DevDC by the high-voltage power source control unit 100) controls a surface potential which is applied to the photo sensitive material and an amount of charges which are applied to a developing agent in correspondence to the determined density set value, thereby automatically adjusting the development density and recording the image information at the optimum image density every image information kind.

An image information receiving unit (not shown) analyzes the input image information and executes the following identifying processes (1) to (3) and supplies the image ID signal to the toner density correction unit 201.

(1) Identification between a text image TEXT and a graphics image GRA

A text image TEXT and a graphics image GRA are identified by checking whether a character generator (not shown) is accessed or not and an image ID signal is supplied to the high-voltage power source control unit 100.

(2) Identification between Japanese output and European language output

A Japanese output and an English or European language output are identified from an access address ADD of the character generator (not shown) which is generally constructed by an ROM and an image ID signal is supplied to the high-voltage power source control unit 100.

(3) Identification of resolution switching

A resolution switching is identified by a resolution switching signal RCS to change image clocks and a rotational speed of the scanner motor and an image ID signal is supplied to the high-voltage power source control unit 100.

The toner density which is optimum to an output image is set on the basis of the image ID signals which are supplied to the high-voltage power source control unit 100 in correspondence to the results of the identifications of the above items (1) to (3).

Figure 2A:
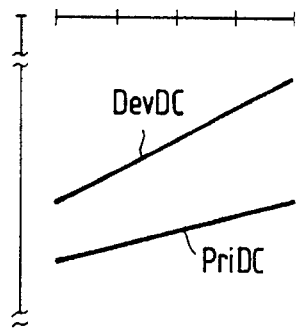
FIGS. 2A to 2C are characteristic diagrams for explaining setting processes of high-voltage DC outputs PriDC and DevDC by a toner density correction unit shown in FIG. 1.
Figure 2B:
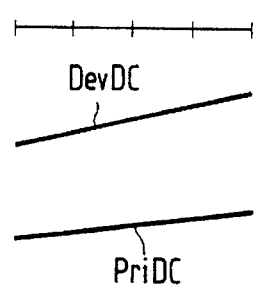
Figure 2C:
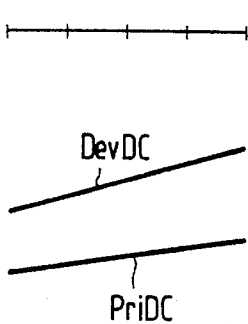

FIGS. 2A to 2C are characteristic diagrams for explaining setting processes of the high-voltage DC outputs PriDC and DevDC by the toner density correction unit 201 shown in FIG. 1. An axis of ordinate indicates a potential and an axis of abscissa shows input/output data. Particularly, FIG. 2A corresponds to the case of no correction. FIG. 2B corresponds to the case of a correction A (correction to a thin image in the embodiment). FIG. 2C corresponds to the case of a correction B (correction-to a dense image in the embodiment).

In the case where the correction A is designated, the toner density correction unit 201 converts the corrects input data IN into output data OUT on the basis of the following equation (1).

$$OUT = 80_H + IN * \frac{1}{2} \quad (1)$$

In the case where the correction B is designated, the toner density correction unit 201 converts and corrects the input data IN into the output data OUT on the basis of the following equation (2).

$$OUT = IN * \frac{1}{2} \quad (2)$$

The first density setting process in the image forming apparatus according to the invention will be described hereinbelow with reference to a flowchart shown in FIG. 2D.

Figure 2D:
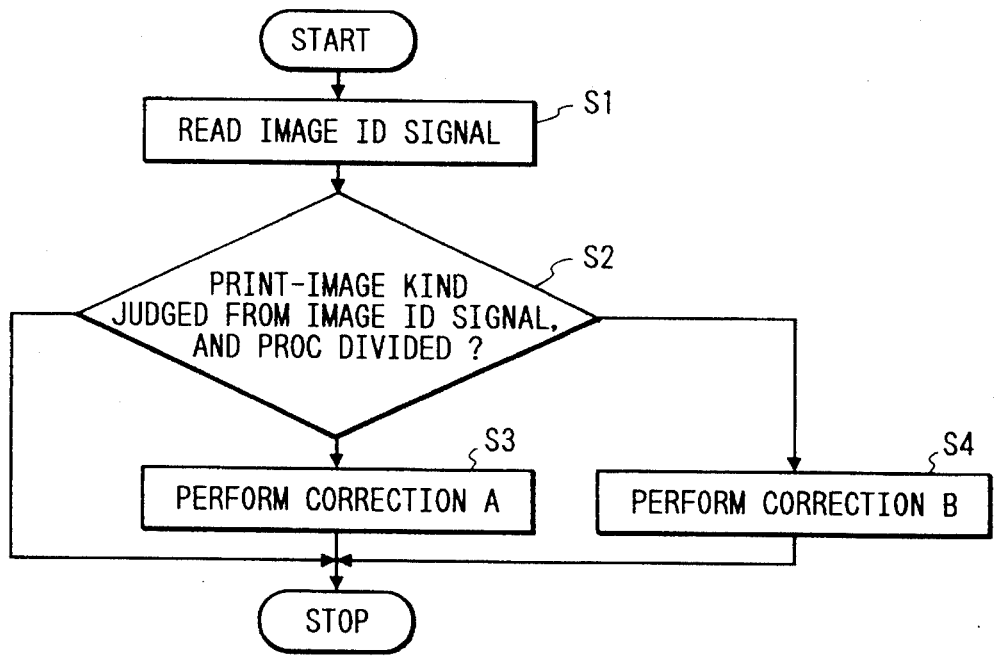
FIG. 2D is a flowchart for explaining an example of the first density setting processing procedure in the image forming apparatus according to the invention.

FIG. 2D is the flowchart for explaining an example of the first density setting processing procedure in the image forming apparatus according to the invention. S1 to S4 indicate processing steps.

A voltage from the volume resistor 101 is converted into digital set data of, e.g., eight bits by the A/D converter 200. The set data is supplied to the toner density correction unit 201.

The toner density correction unit 201 reads the input image ID signal (S1) and selects either one of the arithmetic operating means for operating the correction A, the arithmetic operating means for operating the correction B, and a mode to directly generate the above set data without executing any correction on the basis of the input image ID signal (S2). The correcting process is divided and if no correction is performed, the above set data is directly generated. If it is determined that the correction A is executed, the output data OUT which is derived by the calculation of the equation (1) is sent to the D/A converter 202 (S3). If it is decided that the correction B is executed, the output data OUT which is obtained by the calculation of the equation (2) is sent to the D/A converter 202 (S4). After that, the processing routine advances to the next step.

Although the above processing routine has been described with respect to the case of deciding the output data OUT to two kinds of data by the software process, such a process can be also realized by a hardware. In the case where a density setting instruction is performed by the volume resistor 101, a density can be also set in accordance with the density setting command after completion of the toner density selecting process.

Further, although the image density setting processing timing is not limited in the embodiment, in the case of processing the image information on a page unit basis, the image density setting process can be also switched in the same page on an image unit basis every page.

As specifications peculiar to the printer, in the case of considering (1) English or European language/Japanese correspondence, (2) text/graphics correspondence, (3) resolution switching correspondence, and the like, the following processes (1) to (4) can be performed.

(1) An output image is discriminated by a command through a video interface and the toner density is set, (2) The user sets the toner density which is suitable for an output image or is based on his desire by operating an operation panel.

(3) The toner density is set by a dip switch.

(4) The toner density is unconditionally set every apparatus by a jumper wire or the like.

In the embodiment, the explanation has been made with respect to the case where the toner density correction unit 201 linearly sets the toner density by the output data OUT which is specified by the correcting operation based on the input image ID signal. However, as shown in FIGS. 3A to 3C, it is also possible to construct in a manner such that the correcting operation is changed step by step and the output data OUT is decided.

Figure 3A:
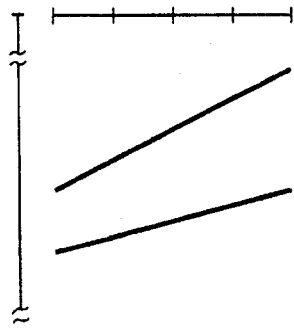
FIGS. 3A to 3C are characteristics diagrams for explaining other setting processes of the high-voltage DC outputs PriDC and DevDC by the toner density correction unit shown in FIG. 1.
Figure 3B:
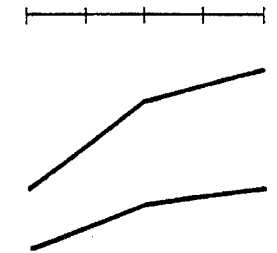
Figure 3C:
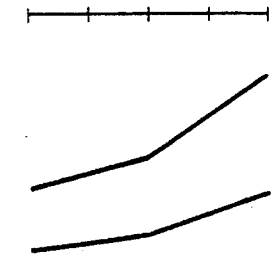

FIGS. 3A to 3C are characteristic diagrams for explaining the setting processes of the high-voltage DC outputs PriDC and DevDC by the toner density correction unit 201 shown in FIG. 1. An axis of ordinate indicates a potential and an axis of abscissa shows input/output data, respectively.

Particularly, FIG. 3A corresponds to the case of executing no correction. FIG. 3B corresponds to the case of a correction AA (correction to a thin image in the embodiment). FIG. 3C corresponds to the case of a correction BB (correction to a dense image in the embodiment).

As will be understood from the diagrams, in the case where the volume resistor 101 has been set to a default position (for instance, in the case where the volume resistor 101 indicates a center position), the toner densities in FIGS. 3B and 3C coincide. In the other cases, however, the toner density is set in accordance with the results of the following correcting operations (11) and (12).

(Correction AA)
When $00_H \leq IN \leq 80_H$, (11)

$OUT = IN * 3/2$,

When $80_H < IN \leq FF_H$, $OUT = 80_H + IN * 1/2$ (Correction BB)
When $00_H \leq IN \leq 80_H$, (12)

$OUT = IN * 1/2$

When $80_H < IN \leq FF_H$, $OUT = -80_H + IN * 3/2$

Figure 3D:
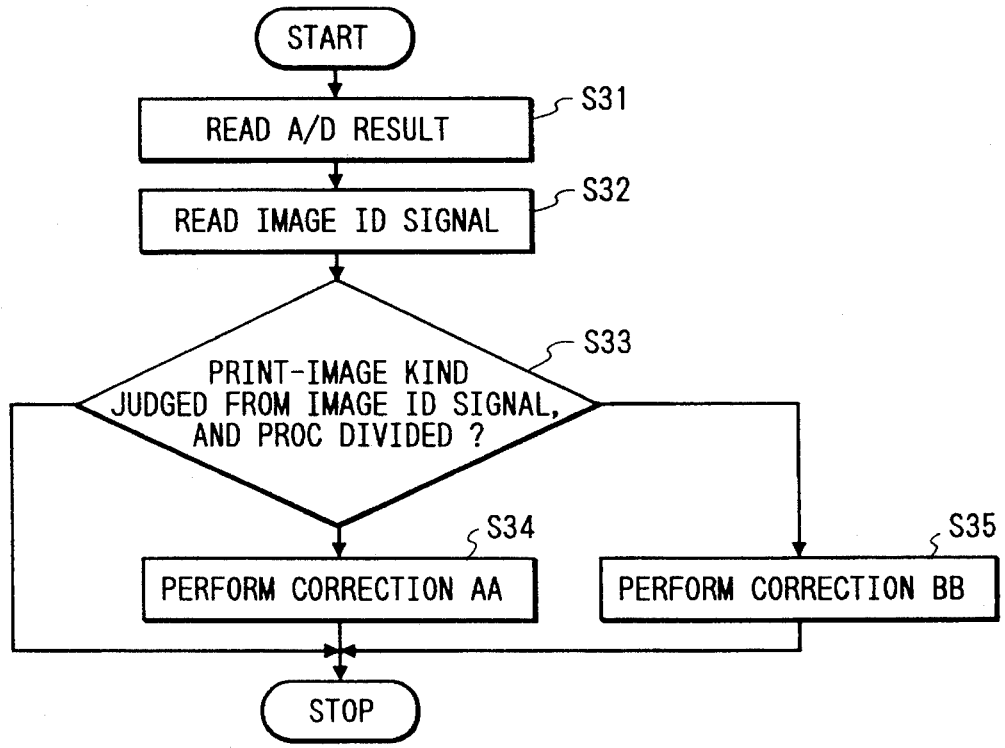
FIG. 3D is a flowchart for explaining an example of the second density setting processing procedure in the image forming apparatus in FIG. 1.

FIG. 3D is a flowchart for explaining an example of the second density setting processing procedure in the image forming apparatus according to the invention. S31 to S35 indicate processing steps.

A voltage from the volume resistor 101 is converted into digital set data of, e.g., eight bits by the A/D converter 200. The set data is supplied to the toner density correction unit 201. The correction unit 201 reads the above set data (S31) and, further, reads the input image ID signal (S32) and selects either one of the arithmetic operating means for operating the above correction AA, the arithmetic operating means for operating the above correction BB, and the mode to directly generate the above set data without executing any correction on the basis of the input image ID signal (S33). The correcting process is divided and in the case of executing no correction, the above set data is directly generated. If it is determined that the correction AA is performed, the output data OUT which is derived by the calculation of the equation (11) is sent to the D/A converter 202 (S34). If it is decided that the correction BB is performed, the output data OUT which is derived by the calculation of the equation (12) is sent to the D/A converter 202 (S35). After that, the processing routine advances to the next step.

Although the explanation has been made with respect to the case where different corrections are executed for two intervals and the toner density is respectively set in the above embodiment, the correcting calculation equations can be set to any one of the linear and curved equations.

The user can also manually set the toner density in a manner similar to the conventional method. Therefore, the invention can cope with various needs.

As described above, according to the embodiment, there are provided: the setting means for analyzing the kind of input image information and for automatically setting the development density set value; and the density adjusting means for controlling a surface potential which is applied to the photo sensitive material and an amount of charges which are applied to the developing agent on the basis of the density set value which has been set by the setting means and for adjusting the development density, so that the optimum toner density based on the input image information can be automatically set. Therefore, there are advantages such that an image can be recorded at the optimum toner density corresponding to the kind of each of various image information without executing complicated density setting processes, an image of a high quality can be always generated, and the like.

Figure 6:
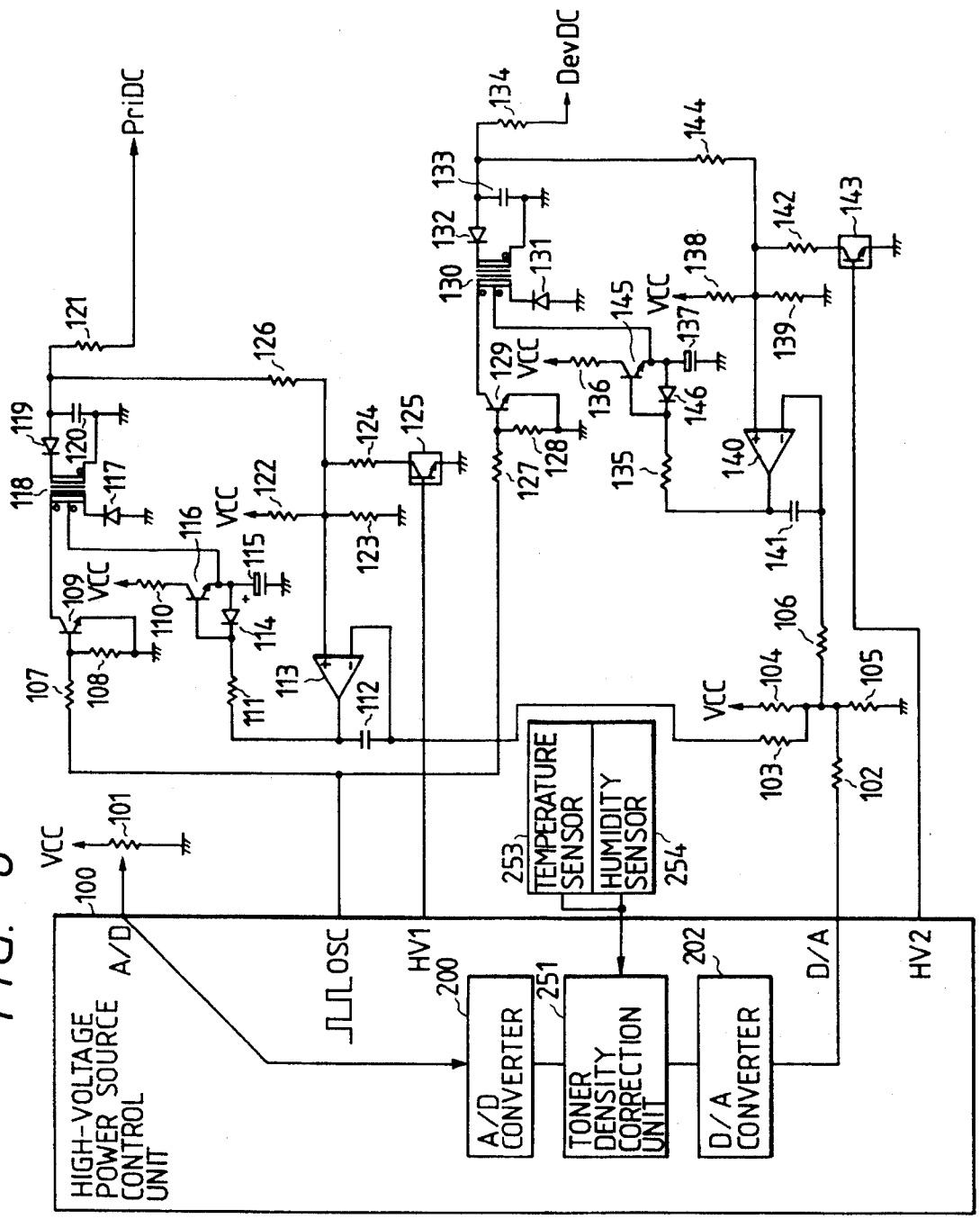
FIG. 6 is a circuit block diagram showing an example of a density setting circuit in an image forming apparatus according to the second embodiment of the invention.

FIG. 6 is a circuit block diagram showing an example of a density setting circuit in an image forming apparatus according to the second embodiment. In FIG. 6, the same parts and components as those shown in FIGS. 1 and 4 are designated by the same reference numerals.

In the diagram, output signals which are generated from the temperature sensor 253 and humidity sensor 254 (state detecting means in the embodiment is constructed by those sensors) which are arranged at predetermined positions around the photo sensitive material are supplied to a toner density correction unit 251. Either one of the correcting operation A, the correcting operation B, and the mode to execute no correction is selected on the basis of the sensor output signals. The above density set data is corrected and converted into a predetermined value. The correction value is supplied to the D/A converter 202. A correction potential is set into the resistor 102 on the basis of the D/A output of the high-voltage power source control unit 100.

In the image forming apparatus constructed as mentioned above, when an circumferential state of a region around the photo sensitive material is detected by the state detecting means (comprising the temperature sensor 253 and the humidity sensor 254 and the like in the embodiment), the setting means (toner density correction unit 251) automatically decides the density set value on the basis of the sensor outputs of the temperature sensor 253 and the humidity sensor 254. In correspondence to the decided density set value, the density adjusting means (setting of the high-voltage DC outputs PriDC and DevDC by the high-voltage power source control unit 100) controls a surface potential which is applied to the photo sensitive material and an amount of charges which are applied to the developing agent, thereby automatically adjusting the development density and enabling the image information to be recorded at the optimum image density every image information kind.

FIGS. 6A to 6C are characteristic diagrams for explaining the setting processes of the high-voltage DC outputs PriDC and DvDC by the toner density correction unit 251 shown in FIG. 6. An axis of ordinate indicates a potential and an axis of abscissa shows input/output data. Particularly, FIG. 6A corresponds to the case of executing no correction. FIG. 6B relates to the case of the correction A (correction to a thin image in the embodiment) corresponding to the case where it is determined that the sensor outputs indicate a high temperature and a high humidity. FIG. 6C relates to the case of the correction B (correction to a dense image in the embodiment) corresponding to the case where the sensor outputs indicate a low temperature and a low humidity.

In the case where the correction A is designated, the toner density correction unit 251 converts and corrects the input data IN into the output data OUT on the basis of the following equation (1').

$$OUT=80_H+IN*\tfrac{1}{2} \qquad (1')$$

In the case where the correction B is designated, the toner density correction unit 251 converts and corrects the input data IN into the output data OUT on the basis of the following equation (2').

$$OUT=IN*\tfrac{1}{2} \qquad (2')$$

The first density setting process in the image forming apparatus according to the invention will now be described hereinbelow with reference to a flowchart shown in FIG. 6D.

FIG. 6D is the flowchart for explaining an example of a density setting processing procedure in the image forming apparatus of the embodiment. S61 to S64 indicate processing steps.

A voltage from the volume resistor 101 is converted into digital set data of, e.g., eight bits by the A/D converter 200.

The set data is supplied to the toner density correction unit 251.

The toner density correction unit 251 reads the sensor output signals from the temperature sensor 253 and the humidity sensor 254 (S61) and selects either one of the arithmetic operating means for operating the correction A, the arithmetic operating means for operating the correction B, and the mode to directly generate the above set data without executing any correction on the basis of the sensor output signals detected (S62). The correcting process is divided and in the case of executing no correction (state in which both of the temperature and the humidity are not high and in which both of them are not low), the above set data is directly generated. If it is determined that the correction A is executed, the output data OUT which is obtained by the calculation of the equation (1) is sent to the D/A converter 202 (S63). If it is decided that the correction B is performed, the output data OUT which is derived by the calculation of the equation (2) is sent to the D/A converter 202 (S64). After that, the processing routine advances to the next step.

Although the case of deciding the output data OUT to two kinds of data by the software process has been described in the above embodiment, such a process can be also realized by a hardware. In the case where a density setting instruction is made by the volume resistor 101, the toner density can be also set in accordance with such a density setting instruction after completion of the toner density selecting process.

Figure 7:
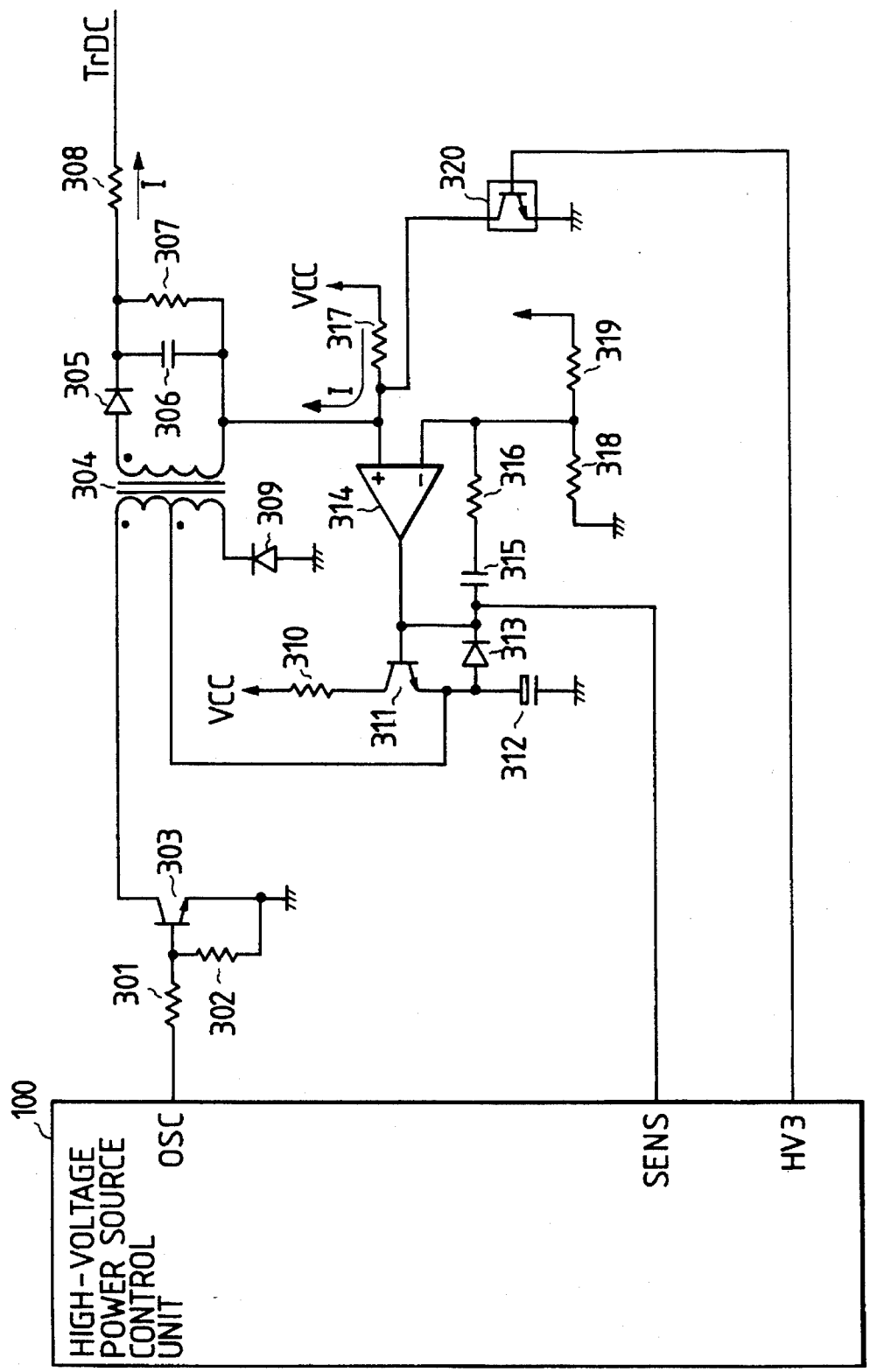
FIG. 7 is a circuit block diagram showing an example of a density setting circuit in an image forming apparatus according to another embodiment of the invention.

In the embodiment, the explanation has been made with respect to the case where the toner density correction unit 251 executes the toner density adjustment on the basis of the output signals of the sensors arranged at predetermined positions around the photo sensitive material. As shown in FIG. 7, however, it is also possible to construct in a manner such that an output of a constant current output circuit (provided in the image forming apparatus based on, e.g., the contact copy transfer system) which is arranged in the high-voltage power source is monitored to thereby detect the circumferential condition.

Since a load of a high-voltage output in the image forming apparatus of the contact coy transfer system has characteristics such that it is largely changed by a fluctuation in environment, the toner density can be adjusted by paying an attention to such an environmental fluctuation.

Particularly, a high-voltage output TrDC is low under conditions of a high temperature and a high humidity (load is heavy) and is high under conditions of a low temperature and a low humidity (load is light ). Consequently, the toner density correction unit 251 separately discriminates the circumferential conditions with respect to three cases of (high temperature and high humidity), (low temperature and low humidity) and the other case on the basis of the voltage value of an input SENS, thereby executing the toner density correction in the following manner.

FIG. 7 is a circuit block diagram showing an example of a density setting circuit in an image forming apparatus according to another embodiment of the invention.

In the diagram, reference numeral 303 denotes a transistor. A pulse signal OSC is supplied to the transistor 303 through resistors 301 and 302 and a driving pulse is supplied from the transistor 303 to the primary side of a transformer 304. A diode 305 and a capacitor 306 are connected to the secondary side of the transformer 304. A rectified high-voltage output TrDC is applied to a load. Reference numerals 307 and 308 denote resistors, 309 indicates a diode, and 312 a capacitor.

Reference numeral 320 indicates a transistor to which an ON/OFF signal is supplied from a port $HV_3$ of the high-voltage power source control unit 100, so that the generation of the high-voltage output TrDC is switched.

The high-voltage output TrDC is proportional to an emitter potential of a transistor 311 and an output of an operational amplifier 314. The operational amplifier 314 executes a constant current operation for allowing a current i which is decided by the following equation (3) to flow into the load through the transformer 304.

$$i = VCC * r_{319}/(r_{318}+r_{319})/r_{317} \qquad (3)$$

where, $r_{319}$: resistance value of a resistor 319

$r_{318}$: resistance value of a resistor 318

$r_{317}$: resistance value of a resistor 317

Reference numerals 310 and 316 denote resistors, 313 a diode, and 315 a capacitor.

As will be understood from the above diagram, by monitoring an output of the constant current output circuit through the operational amplifier 314, the circumferential conditions are separately discriminated with respect to three cases of (high temperature and high humidity), (low temperature and low humidity), and the other case and the toner density correction is executed in a manner similar to the foregoing embodiments.

It will be obviously understood that the user can always adjust the toner density to a desired value by operating the volume resistor 101.

As described above, according to the embodiment, there are provided: the state detecting means for detecting an environmental state of a region around the photo sensitive material; the setting means for automatically setting the development density set value on the basis of the result of the detection of the state detecting means; and the density adjusting means for controlling the surface potential which is applied to the photo sensitive material and an amount of charges which are applied to the developing agent on the basis of the density set value which has been set by the setting means and for adjusting the development density. Therefore, the high-voltage control conditions can be automatically decided so as to obtain the optimum toner density while certainly detecting the occurrence of a circumferential fluctuation such as to exert an influence on the toner density. Consequently, there are advantages such that there is no need to execute complicated density setting operations, an image of a high quality can be-always obtained, and the like.

Figure 9:
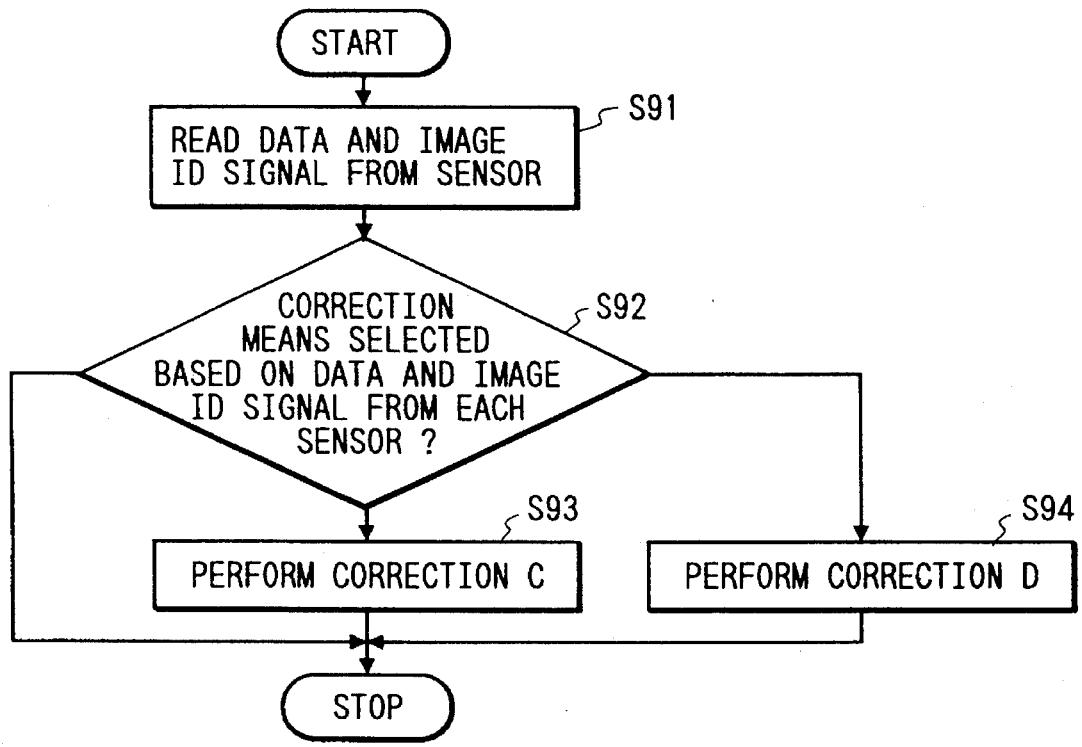
FIG. 9 is a flowchart for explaining an example of a density setting processing procedure in the apparatus in FIG. 8.
Figure 8:
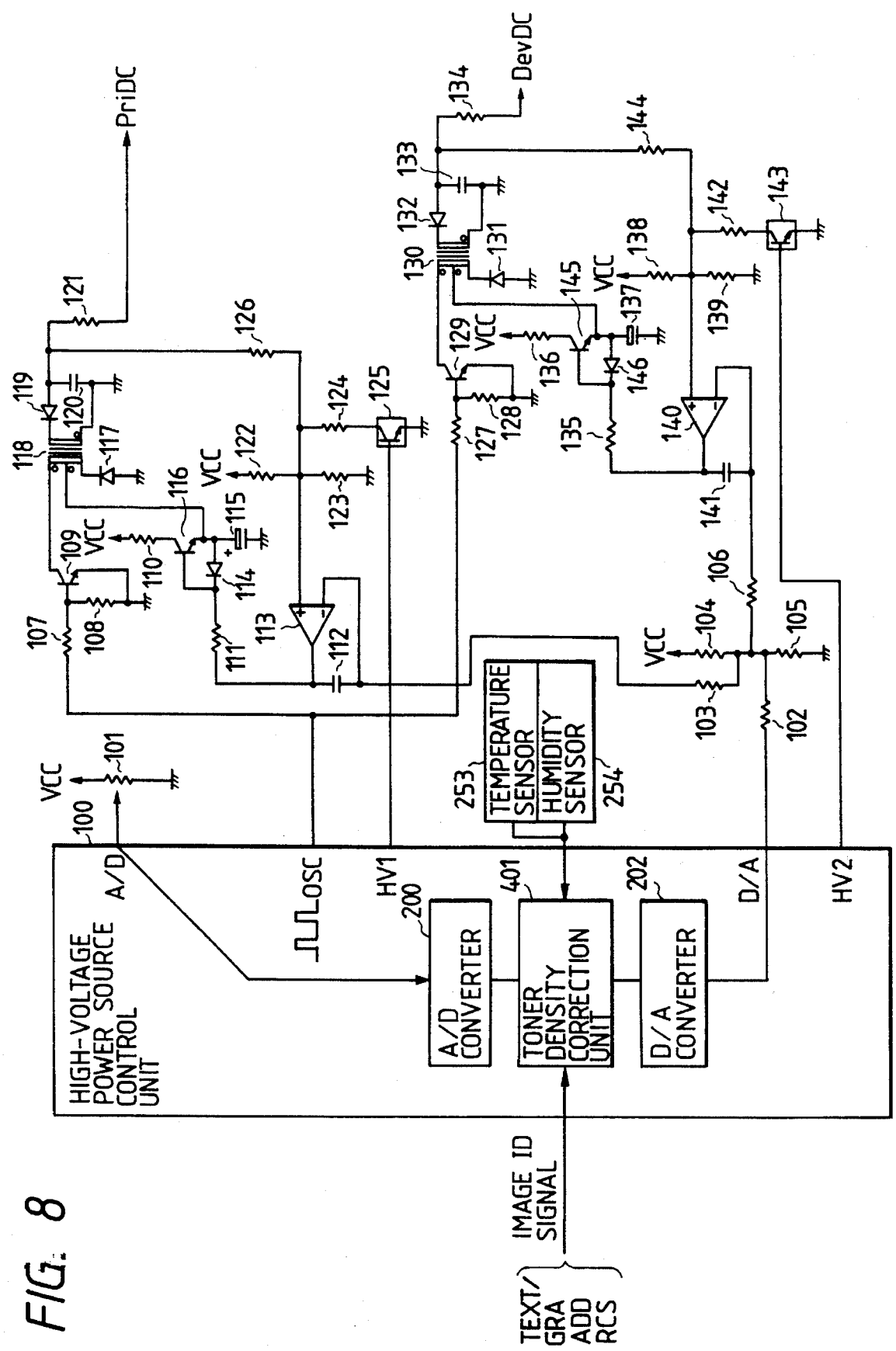
FIG. 8 is a diagram showing a density setting circuit in an image forming apparatus according to the third embodiment of the invention.

FIGS. 8 and 9 show the third embodiment of the invention. According to the third embodiment, a development density is automatically set on the basis of both of the image ID signal and the circumferential state of a region around the photo sensitive material.

In FIG. 8, the same parts and components as those shown in FIGS. 1, 4, and 6 are designated by the same reference numerals.

In FIG. 8, reference numeral 401 denotes a toner density correction unit constructed by a microcomputer. The toner density correction unit 401 selects toner density correction characteristics on the basis of both of the sensor output data from the temperature sensor 253 and the humidity sensor 254 and the image ID data such as signal TEXT/GRA indicative of whether the input image is a text image TEXT or a graphics image GRA, signal ADD indicative of whether a language is Japanese or European language, resolution switching signal RCS, and the like. FIG. 9 shows a flowchart for the above control.

That is, both of the sensor output data from the sensors 253 and 254 and the image ID data are read in step S91. The correcting process is selected on the basis of both of the above data in step S92. That is, if both of the environmental data and the image ID data are in a complementary state, the standard correction characteristics are selected. If they are in a multiplicative state, correction characteristics of a larger inclination are selected.

With the above construction, the density adjustment can be performed in accordance with both of the image ID signal and the environmental state.

In the first, second, and third embodiments of the invention, the density has been corrected by controlling the charging voltage PriDC and the development bias voltage DevDC. However, a light amount of the laser, LED, or the like can be also variably controlled. The density can be also controlled by changing a width and a level of the image signal. Particularly, in the case of multi-value data, a gamma conversion characteristic can be also changed.

Although the density adjustment instruction has been performed by the variable resistor 101 on the printer side, such a density adjustment can be also instructed to the control unit 100 from the side of the host computer 20.

The kind of printer is not limited to the electrophotographic printer but the invention can be also applied to various other printers such as ink jet printer, thermal printer (of the copy transfer type), and the like.

In the case of the ink jet printer, the density can be corrected by modulating the image signal itself.

In the case of the thermal printer, the density can be corrected by changing a voltage which is applied to a thermal head.

As described above, according to the invention, since the optimum density adjustment can be performed in accordance with the kind of processing image data, circumferential conditions, and the like, the invention is extremely useful.

The present invention is not limited to the foregoing embodiments but many modifications and variations are possible within the spirit and scope of the appended claims of the invention.

What is claimed is:

1. A printer apparatus comprising:

input means for inputting an image signal and image type information of the image signal;

discriminating means for discriminating image type information input by said input means in accordance with a signal other than the image signal to be recorded;

image forming means for forming an image on the basis of image type information, the image being formed with an optical reflective density which is adjustable; and density adjusting means for adjusting the optical reflective density for image formation by said image forming means in accordance with the discriminated image type information, wherein said discriminating means discriminates whether the image information which is supplied by said input means indicates a text image or another image as the image type information.

2. An apparatus according to claim 1, wherein said image forming means is an electrophotographic printer and said density adjusting means adjusts processing conditions of said printer.

3. A printer apparatus comprising:

input means for inputting an image signal and image type information of the image signal;

discriminating means for discriminating image type information input by said input means in accordance with a signal other than the image signal to be recorded;

image forming means for forming an image on the basis of image type information, the image being formed with an optical reflective density which is adjustable; and density adjusting means for adjusting the optical reflective density for image formation by said image forming means in accordance with the discriminated image type information, wherein said discriminating means discriminates a kind of font for a text image which is included in the image information which is supplied by said input means as the image type information.

4. An apparatus according to claim 3, wherein said image forming means is an electrophotographic printer and said density adjusting means adjusts the processing condition of said printer.

5. A printer apparatus comprising:

input means for inputting an image signal and image type information of the image signal;

discriminating means for discriminating image type information input by said input means in accordance with a signal other than the image signal to be recorded;

image forming means for forming an image on the basis of image type information, the image being formed with an optical reflective density which is adjustable; and density adjusting means for adjusting the optical reflective density for image formation by said image forming means in accordance with the discriminated image type information, wherein said discriminating means discriminates whether the image type information which is supplied by said input means indicates a text image.

6. An apparatus according to claim 5, wherein said image forming means is an electrophotographic printer and said density adjusting means adjusts the processing condition of said printer.

7. A printing method comprising the steps of:

inputting an image signal and image type information of the image signal;

discriminating the image type information input in said inputting step in accordance with a signal other than the image signal to be recorded;

causing a print engine to form an image on the basis of the image type information, the image being formed with an optical reflective density which is adjustable; and adjusting the optical reflective density for image formation by the print engine in accordance with the image type information discriminated in said discriminating step, wherein, in said discriminating step, a kind of font for a text image which is included in the image type information supplied in said inputting step is discriminated as the image type information.

8. A method according to claim 7, wherein the print engine is an electrophotographic printer and said adjusting step adjusts a processing condition of the printer.

* * * * *

UNITED STATES PATENT AND TRADEMARK OFFICE
CERTIFICATE OF CORRECTION

PATENT NO. : 5,513,012

DATED : April 30, 1996

INVENTOR(S) : Makoto Takeuchi, et al.

It is certified that error appears in the above-identified patent and that said Letters Patent is hereby corrected as shown below:

COLUMN 5:

Line 50, "(correction-to" should read --(correction to--; and
Line 53, "the corrects" should read --and corrects the--.

COLUMN 9:

Line 36, ".arranged" should read --arranged--; and
Line 40, "coy" should read --copy--.

COLUMN 12:

Line 15, "image" should read --image type--.

Signed and Sealed this

Third Day of September, 1996

Attest:

BRUCE LEHMAN

Attesting Officer          Commissioner of Patents and Trademarks